Patented May 26, 1936

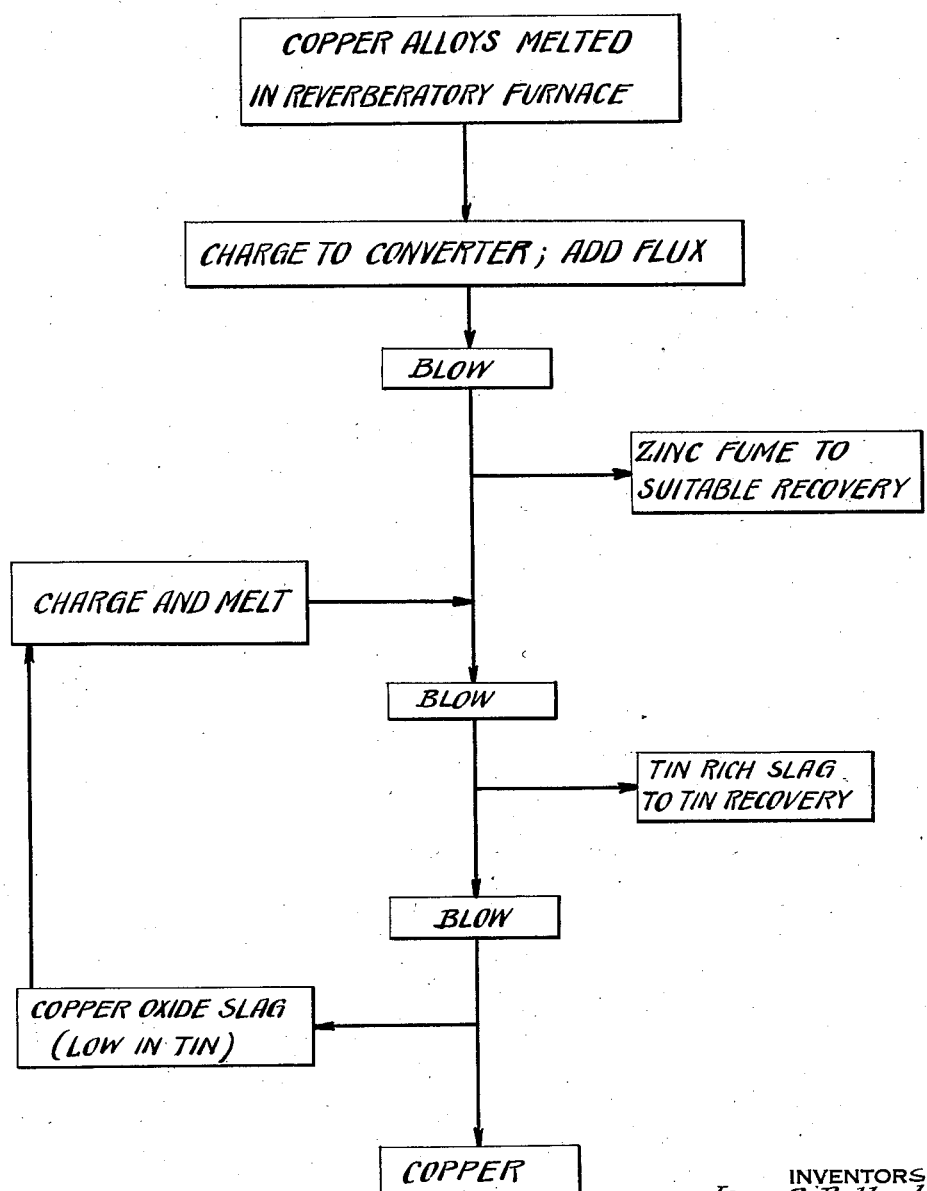

2,042,291

UNITED STATES PATENT OFFICE 2,042,291

PROCESS FOR REFINING COPPER ALLOYS

Jesse O. Betterton and Albert J. Phillips, Metuchen, N. J., assignors to American Smelting and Refining Company, New York, N. Y., a corporation of New Jersey Application May 18, 1934, Serial No. 726,294

16 Claims. (Cl. 75—63)

The present invention provides an improved process for salvaging brass and bronze secondary metals and miscellaneous copper alloy scrap to recover the metallic values contained therein, and more particularly provides a process whereby a substantially complete separation of the zinc, tin, and lead from the copper may be accomplished.

The usual procedure for salvaging metal values from brass and bronze secondary metals is to melt the charge and blow with air in a converter to remove the volatile metals, namely, zinc, tin, and lead, and to subsequently refine the residual blister copper either by the usual fire-refining methods or by electrolytic refining. This blowing operation oxidizes the zinc, tin, and lead which are removed from the copper as a mixed dust or fume, and are collected in a baghouse, Cottrell plant, settling chamber, or other means; and while various processes have been proposed for separating the zinc from the lead and tin oxides (for example, by leaching with sulphuric acid), only a partial recovery of these metals is obtained and the cost of the recovery is relatively high.

The present invention has for one of its general objects the providing of an improved process for separating the zinc, tin and lead from the copper contained in brass, bronze and miscellaneous copper alloy scrap.

A further object of the invention is to provide a process wherein the aforesaid separation is accomplished by the production of two general products, namely, a fume containing practically all the zinc together with about half of the lead, and the other a slag containing practically all of the tin together with relatively smaller amounts of lead and a certain amount of copper.

Other objects of the invention will appear hereinafter, the novel features and combinations being set forth in the appended claims.

The drawing accompanying this specification is a flow sheet illustrating the general outline of the present process.

In accordance with the present improved process, the secondary brass or bronze is melted in a reverberatory furnace, or other suitable melting furnace, and the resulting molten metal is transferred into a converter of standard construction. A small amount of a flux is charged on top of the molten metal. A desirable flux has been found to comprise soda ash, sand and coke, although other fluxing materials may be employed. The converter is rotated and the charge is blown with air in the usual manner, the air supply being controlled, however, so as to substantially completely eliminate the zinc without removing tin to any appreciable extent.

This blowing operation results in a fume which contains practically all of the zinc which was present in the original material and about half of the original lead content. This fume is collected in a baghouse, Cottrell plant, or any other suitable collecting means, and is treated for the recovery of the metallic content thereof. A suitable method of treatment is to smelt the mixed oxide fume with carbon in the presence of a moving reducing atmosphere, which volatilizes all of the zinc, which is recoverable as zinc oxide or blue powder, while by the same operation, the lead oxide is reduced to metallic lead.

After the zinc has been eliminated from the converter charge, as above explained, the accumulated dross or slag is removed from the converter, and a copper oxide slag obtained from a previous run and prepared in a manner hereinafter set forth is charged into the converter which is blown until the slag has been thoroughly incorporated into the metallic charge in the converter. This slag is rich in copper, in the form of copper oxide and relatively low in tin, and the tin in the metal charge of the converter reacts with the copper oxide of the slag to form tin oxide, which floats off the surface of the charge, the resulting reduced copper joining the charge of metal in the converter. The amount of the copper oxide charged into the converter, and the blowing of the converter are so regulated that the tin in the metal is reduced to approximately 1%, there being produced a slag which therefore contains practically all of the tin in the original metal, about one-third of the lead, and some copper, the copper to tin ratio in this slag being not more than 1:1. It has been found in practice that this slag contains approximately 20% of tin and approximately 20% of copper; and it will be seen that this slag constitutes a concentrated tin product from which a valuable tin alloy or tin-containing material may be produced economically, without going through the involved steps of separation from the zinc fume.

After this concentrated tin slag has been removed from the converter, the converter is turned back and blown with air in order to effect the complete removal of tin and other impurities from the remaining copper bath. This operation produces a slag relatively low in tin and rich in copper, and constitutes the rich copper oxide slag which is referred to above as being added to the converter charge after the elimination of the zinc from the charge and which produces the rich-tin slag described above. It will be understood, of course, that this low tin, rich-copper slag is preserved after its removal from the converter and is returned to the next charge at the end of the zinc blow, as described above.

It has been found that the production of the tin-rich slag is greatly facilitated by the use of suitable fluxing materials, such as sand, sodium silicate (which may be formed from soda ash and sand), borax, fluorspar, cryolite, etc.

The tin-rich slag is reduced by any suitable method to metal and produces a valuable tin alloy. This reduction may be accomplished readily by smelting with carbon in a reducing atmosphere.

To specifically illustrate the process, the following example of its operation may be mentioned:

73,730 parts by weight of brass having the composition 73.97% Cu, 6.7% Pb, 3.55% Sn, and 15.85% Zn, were charged into the converter along with 600 parts by weight of coke, 200 parts by weight of soda ash and 500 parts by weight of sand. The converter was blown with air for 45 minutes, producing 4,710 parts by weight of slag and yielding a metal containing 87.6% Cu, 5% Pb, 3.65% Sn and 3.25% Zn. The metals eliminated from the bath were mainly in the form of a fume containing 64% Zn, 13% Pb and 2% Sn. To the metal remaining in the converter, 10,000 parts by weight of "tin skim", (the low tin, rich-copper slag forming the end product from the previous run, as described above), containing 36.8% Cu, 9.6% Pb, 10.7% Sn and 13% Zn, were charged. The metal in the converter was heated for two hours in order to alloy this "tin skim" with the charge, and at the same time the metal was blown with air for short intervals, amounting to a total of thirty minutes. This procedure produced a tin slag of 12,950 parts by weight, containing 21.8% Cu, 9.8% Pb, 22.5% Sn, and 17.8% Zn. This tin-rich slag was removed from the converter and put aside for subsequent reduction to tin alloy. The metal left in the converter contained 94.4% Cu, 3.9% Pb, 1% Sn, and 0.2% Zn. 750 parts by weight of sand were then charged into the converter and the metal blown with air for 25 minutes. This produced a slag of 8,820 parts by weight containing 46.6% Cu, 19.8% Pb, 6.5% Sn, and 6.6% Zn. This slag was removed from the converter to be returned to the next charge after the zinc blow. The finished metal was then tapped from the converter and was found to analyze 96.8% Cu, 0.3% Pb, 0.05% Sn, and 0.2% Zn.

Various modifications of the above-indicated procedure may be carried out, as will become apparent to one skilled in the art. Thus, instead of operating the process so as to obtain the low tin, rich copper slag referred to above as being produced for recharging into the converter after the first blow to eliminate the bulk of the zinc, thereby producing the copper-lead-tin-zinc slag of 1:1 copper-tin ratio, the blowing may be carried through to produce a single final slag having a composition intermediate the compositions of the two slags above referred to and which contains substantially all of the tin not driven off with the zinc during the fuming blow of the converter. This slag is removed before the converter is tapped at the completion of the operation, and is returned to the converter in the succeeding run after the completion of the fuming off of the main part of the zinc of the succeeding charge of metal, being used, therefore, instead of the low tin, rich copper slag previously referred to. Continued blowing of the converter will then produce from this slag a concentrated tin slag having approximately the 1:1 copper-tin ratio of the slag mentioned above. This slag is removed for further treatment, silica is added as described in the example, and the blowing continued, thereby producing from the metal in the charge a slag rich in copper, which corresponds to the low tin, rich copper slag previously referred to; and this slag may be sent on to a cupola, instead of being returned to the converter, and reduced in the cupola to metal, which may be returned to the converter for further treatment.

The 1:1 copper-tin slag may be sent to a blast furnace where the zinc content thereof is fumed off and the iron content is eliminated in a slag, leaving a tin-lead-copper alloy of a character easily amenable to treatment for removal of the copper while leaving the tin and lead in a form readily convertible into solder metal.

It will be seen that an effective separation is obtained in a simple manner, and that involved operations are avoided by this process.

While certain novel features of the invention have been disclosed and are pointed out in the annexed claims, it will be understood that various omissions, substitutions and changes may be made by those skilled in the art, and that it is intended and desired to embrace within the scope of this invention such modifications and changes as may be necessary to adapt it to varying conditions and uses.

What is claimed is:

1. The process of refining copper alloy scrap containing zinc and tin, which comprises melting the alloy, blowing the molten alloy with regulated quantities of air to effect a selective volatilization of the zinc, forming a slag containing a major portion of the tin, separating the said slag from the remaining metal, and treating the remaining metal to form a slag containing substantially all of the tin remaining in the metal after separation of the aforesaid slag.

2. The process of refining copper alloys containing zinc and tin for the removal of the zinc and tin therefrom, which comprises melting the alloy, blowing the molten alloy with regulated quantities of air to effect a selective volatilization of the zinc substantially free from tin, reacting upon the tin to form a slag containing substantial amounts of the tin, and blowing air through the remaining metal to convert the remaining tin into a slag.

3. The process of refining copper alloys containing zinc and tin, which comprises melting the alloy, blowing the melted alloy with air thereby effecting selective volatilization of the zinc substantially free from tin, reacting upon the tin with copper oxide to form a tin-rich slag containing a substantial amount of the tin of the alloy, and thereafter continuing the blowing to oxidize the remaining tin to form a slag containing substantially all of the remaining tin.

4. The process of refining copper alloys containing zinc and tin, which comprises selectively volatilizing the zinc substantially free from tin and oxidizing the residual alloy in the presence of a suitable flux to convert the tin thereof into a slag.

5. The process of refining copper alloys containing zinc and tin, which comprises selectively volatilizing the zinc to the substantial exclusion of tin, and adding to the residual alloy sufficient copper oxide to convert substantial amounts of the tin into a slag.

6. The process of refining copper alloys containing zinc and tin, which comprises selectively volatilizing the zinc to the substantial exclusion of tin, converting the bulk of the tin into an oxide slag, by adding to the residual alloy sufficient copper oxide to convert substantial amounts of tin into tin oxide, and continuing to oxidize the remaining tin until substantially all of the tin has been converted into slag.

7. The process of refining copper alloys containing zinc and tin, which comprises melting the alloy, subjecting the molten alloy to regulated oxidizing conditions for selectively volatilizing the zinc substantially free from tin, converting the bulk of the tin into an oxide slag, separating the said slag from the residual metal, and treating the residual metal to convert substantially the entire remaining content of tin into a slag.

8. The process of refining copper alloys containing zinc and tin, which comprises melting the alloy, subjecting the molten alloy to regulated oxidizing conditions for selectively volatilizing the zinc substantially free from tin, converting the major portion of the tin into a slag rich in tin, separating the said slag from the residual metal, treating the residual metal with air to convert substantially the entire remaining amount of tin into a slag containing also copper oxide in preponderating amounts, and utilizing this slag in subsequent refining operations for producing the said slag rich in tin.

9. The process of refining copper alloys containing tin for removing the tin therefrom, which comprises melting the alloy, adding copper oxide thereto to form a slag rich in tin, subjecting the remaining metal to oxidation to form a slag containing substantially all of the remaining amounts of tin, together with relatively larger amounts of copper oxide, and utilizing this slag as the source of copper oxide for producing, in subsequent operations, the said slag rich in tin.

10. The process of refining copper alloys containing tin for removing the tin therefrom, which comprises melting the alloy, adding copper oxide thereto to form a slag rich in tin, separating the said slag from the remaining metal, blowing air through the remaining metal to form a slag containing substantially all of the remaining tin together with larger amounts of copper oxide, and utilizing this slag as the source of copper oxide for producing the said slag rich in tin, in subsequent refining operations.

11. The process of refining copper alloys containing zinc and tin for removing the tin therefrom, which comprises melting the alloy, subjecting the molten alloy to regulated oxidizing conditions for selectively volatilizing the zinc substantially free from tin, adding copper oxide to the remaining alloy to form a slag rich in tin and containing the major portion of the tin of the original alloy, separating the said slag from the remaining metal, blowing air through the remaining metal to form a slag containing substantially all of the residual tin together with larger amounts of copper oxide, and utilizing this slag as the source of copper oxide for producing the said slag rich in tin during subsequent refining operations.

12. The process of refining copper alloys containing tin for removing the tin therefrom, which comprises melting the alloy, adding to the molten alloy copper oxide in quantities sufficient to convert at least the major portion of the tin into a tin-rich slag containing substantial amounts of tin oxide, removing said slag and blowing the molten metal with air to complete the removal of tin therefrom.

13. The process of refining copper alloys containing zinc and tin, which comprises melting the alloy, selectively volatilizing the zinc substantially free from tin, adding copper oxide to the remaining molten metal, allowing the copper oxide to react with the tin to form a slag having a relatively high tin content with corresponding depletion of the tin content of the original alloy, and separating the resulting slag from the remaining metal.

14. The process of refining copper alloys containing zinc and tin, which comprises melting the alloy, effecting volatilization of the major part of the zinc substantially free from tin, reacting upon the remainder of the alloy under oxidizing conditions to produce a slag containing substantially all of the tin together with substantial amounts of copper, separating this slag from the residual refined material, and returning this slag to a succeeding charge of alloy to produce a slag in which the tin is concentrated.

15. The process of refining copper alloys containing zinc, lead and tin, which comprises forming a molten bath of the alloy, effecting volatilization of the major part of the zinc substantially free from tin, reacting upon the remainder of the alloy under oxidizing conditions to produce a slag containing substantially all of the tin and lead together with substantial amounts of copper, separating this slag from the residual refined material, tapping the said refined material, returning the said slag to a succeeding charge of alloy to produce a slag in which the tin is concentrated, separating this slag from the metal bath, continuing refining the bath under oxidizing conditions until completion of refining is effected together with the formation of a slag rich in copper and containing only minor amounts of lead and tin, separating this slag, reducing the same to metal, and adding the resulting metal to a succeeding charge of alloy for further refining.

16. The process of refining copper alloys containing zinc and tin, which comprises charging a molten bath of the alloy to be refined into a converter, adding suitable slag-producing materials thereto, blowing the converter until the major part of the zinc of the bath has been volatilized, continuing to blow the converter until the copper is substantially completely refined and a slag containing substantially all of the tin together with substantial amounts of copper is produced, separating the said slag from the refined copper, returning this slag to the converter during treatment of a succeeding charge of alloy, thereby producing a tin-copper slag in which the tin has been concentrated to an amount substantially equal to the amount of copper contained therein, separating this slag from the remaining charge, continuing to blow the converter to substantially complete refining of the residual charge while producing a slag rich in copper with only minor amounts of tin and zinc, separating and reducing this slag to metal, and returning this metal to the converter for further refining.

JESSE O. BETTERTON.
ALBERT J. PHILLIPS.